United States Patent Office 2,951,867
Patented Sept. 6, 1960

2,951,867

B-SUBSTITUTED, N-SUBSTITUTED BORAZOLES

Stanley F. Stafiej, Stamford, and Stephen J. Groszos, Darien, Conn., assignors to American Cyanamid Company, New York, N.Y., a corporation of Maine No Drawing. Filed Oct. 2, 1957, Ser. No. 687,618

2 Claims. (Cl. 260—551)

This invention relates to new chemical compounds and more particularly to new compounds containing boron and nitrogen, and to a method of preparing the same. Still more particularly, the invention is concerned with new and useful substituted borazoles.

A review of borazoles by E. Wiberg appears in Naturwissenschaften, 35, 182, 212 (1948). Gould, U.S. Patent No. 2,754,177, dated July 10, 1956, discloses borazoles represented by the general formula (I)
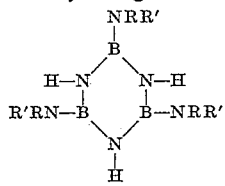

where R and R' are alkyl, aryl, alkaryl, or aralkyl radicals, or hydrogen.

The borazoles claimed in the present application are B-substituted, N-substituted borazoles. Specifically they are B-amino (i.e., B-unsubstituted amino) borazoles which, unlike the borazoles of Gould, supra, have a carbocyclic radical attached to each of the nitrogen atoms of the borazole ring instead of a hydrogen atom. They may be represented graphically by the following general formula (II)
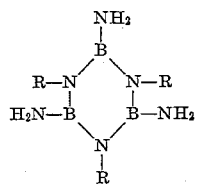

where R represents a carbocyclic radical. They are members of the broader class of borazoles which may be represented by the general formula (III)
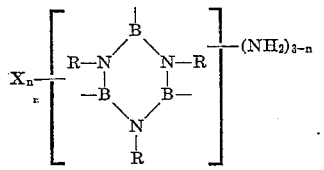

where R represents a carbocyclic radical, X represents a halogen (chlorine, bromine, fluorine or iodine) and $n$ represents an integer which is at least 1 and not more than 2. The borazoles embraced by Formula III are, in turn, members of a still broader class of borazoles which may be represented by the general formula (IV)
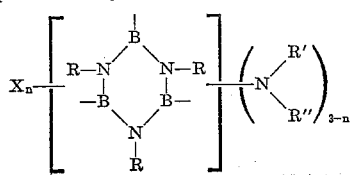

where R, X and $n$ have the same meanings as given above with reference to Formula III; R' and R", when taken separately, each represents a member of the class consisting of hydrogen and hydrocarbon (substituted or unsubstituted hydrocarbon) radicals, and, when taken together with the nitrogen atom, represents the residue of a tertiary amine.

Referring again to Formula II, which formula embraces the borazoles claimed in the instant application, and to the further statement that R in that formula represents a carbocyclic radical. Illustrative examples of carbocyclic radicals represented by R in Formula II (also in Formulas III and IV) are phenyl, mono- and polyalkylphenyls (e.g., tolyl, xylyl, mono-, di- and triethyl, -propyl, -isopropyl, -butyl, -allyl, etc., phenyls), biphenylyl or xenyl, naphthyl, mono- and polyalkylnaphthyls (e.g., methylnaphthyl, diethylnaphthyl, tripropylnaphthyl, etc.), tetrahydronaphthyl, anthryl, mono- and polyalkylanthryls (e.g., mono-, di-, tri- and tetramethyl, -ethyl, -propyl, -butyl, etc., anthryls), the various cycloalkyls (e.g., cyclopentyl, cyclohexyl, cycloheptyl, etc.), the various cycloalkenyls (e.g., cyclopentenyl, cyclohexenyl, cycloheptenyl, etc.), and halogenated (chlorinated, brominated, fluorinated and iodinated) carbocyclic radicals corresponding to those mentioned above, e.g., mono-, di-, tri- and tetrachloro-, bromo-, fluoro- and iodophenyl, etc. Other examples include the alkoxy (e.g., methoxy, ethoxy, propoxy, butoxy, etc.) carbocyclic radicals corresponding to the carbocyclic hydrocarbon radicals given above by way of example. Still other examples of carbocyclic radicals will be apparent to those skilled in the art from the foregoing illustrative examples.

The compounds embraced by Formula II range from semi-solids to solids in the normal state. The compounds that are claimed herein are those substituted borazoles having the general formula shown in Formula II wherein R represents, more specifically, a carbocyclic radical selected from the class consisting of the phenyl, p-tolyl and cyclohexyl radicals. They are characterized by greater hydrolytic resistance and thermal resistance (often referred to as "hydrolytic stability" and "thermal stability") as compared with the B-triaminoborazoles wherein hydrogen is attached directly to each of the ring nitrogen atoms. As a result, their fields of utility are increased as compared with the aforementioned B-triaminoborazoles which are unsubstituted on the ring nitrogen atoms.

The borazoles embraced by Formula II are useful, for instance, as chemical intermediates. For example, they can be employed as a reactant with ingredients including an active carbonyl-containing compound, e.g., an aldehyde or a compound engendering an aldehyde such, for instance, as formaldehyde, acetaldehyde, propionaldehyde, butyraldehyde, valeraldehyde, acrolein, methacrolein, furfural, crotonaldehyde, heptaldehyde, octaldehyde, benzaldehyde, hydroxyaldehydes (e.g., aldol, glycollic aldehyde, glyceraldehyde, etc.), paraformaldehyde, trioxane, hexamethylenetetramine, dimethylol urea, trimethylol melamine, etc., or mixtures thereof, to yield a new and useful class of resinous compositions. They also are useful as latent-curing catalysts, for example as latent-curing catalysts for epoxoy resins and the like. They can be employed in high-temperature applications, as modifiers of conventional polymeric materials, including synthetic resins, and as neutron absorbers. They also are useful as components of flame-resisting compositions; as plasticizers; as scintillation counters; in various agricultural applications including use as the active ingredient in insecticides, bactericides, germicides fungicides, pesticides and the like; as rocket fuels or as additives thereto; as a component of arc-extinguishing tubes, and especially of surfaces that are exposed to the action of the arc. Other uses include: as polymer additives to impart neutron-absorbing properties to the polymer to which the compound of the invention is added and to improve the thermal stability of the polymer; as heat-exchange media or as modifiers of such media whereby they can be used at higher temperatures; as petroleum additives which are hydrolytically stable (e.g., as viscosity-index improvers, in lubricants and greases for high-temperature applications, as cetane improvers, ignition promoters, anti-knock agents, preventives of pre-ignition, etc.); and in making new types of dyes and pigments.

In any of the aforementioned and other applications or uses, one can employ a single compound of the kind embraced by Formula II or a plurality of such compounds in any proportions. They can be used in conjunction with any of the conventional components of rocket fuels, flame-resisting compositions, plasticizers, insecticides, bactericides, germicides, fungicides, pesticides, and other compositions hereinbefore mentioned by way of illustrating the fields of utility, generically and specifically, of the borazoles of the claimed invention.

The N-tricarbocyclyl-B-triaminoborazoles of this invention are prepared by, for example, contacting an N-tricarbocyclyl-B-trihalogenoborazole with ammonia, preferably an excess of ammonia, at ambient temperatures (e.g., 20°–30° C.) or sub-ambient temperatures (e.g., down to, say, −80° C.). At the end of the reaction period the unreacted ammonia is removed, leaving the impure N-tricarbocyclyl-B-triaminoborazole, which can be purified by removal of the by-product ammonium halide with which it is admixed.

Use of one mole of ammonia per mole of N-tricarbocyclyl-B-trihalogenoborazole will yield a borazole comprising, in preponderant proportion, N-tricarbocyclyl-B-amino-B′,B″-dihalogenoborazole; while use of two moles of ammonia per mole of N-tricarbocyclyl-B-trihalogenoborazole will yield a borazole comprising, in preponderant proportion, N-tricarbocyclyl-B,B′-diamino-B″-halogenoborazole. Use of three moles or more of ammonia will yield a product comprising a borazole of the kind embraced by Formula II, that is, an N-tricarbocyclyl-B-triaminoborazole, which also may be designated as an N,N′,N″-tricarbocyclyl-B,B′,B″-triaminoborazole.

The N-tricarbocyclyl-B-trihalogenoborazole to which reference was made in the preceding paragraphs can be any of the following: N-tricarbocyclyl-B-trichloroborazole, N-tricarbocyclyl-B-tribromoborazole, N-tricarbocyclyl-B-trifluoroborazole, or N-tricarbocyclyl-B-triiodoborazole. We prefer to use the N-tricarbocyclyl-B-trichloro- or B-tribromoborazole.

A preferred procedure comprises reacting the N-tricarbocyclyl-B-trihalogenoborazole with an excess of liquid ammonia, under anhydrous conditions, at a low temperature (e.g., below 0° C.); removing the excess of ammonia, e.g., by allowing or causing it to evaporate; refluxing the solid residue with an anhydrous, inert, organic, liquid medium, e.g., benzene, toluene, xylene, etc.; separating the solid ammonium halide by filtration; and cooling the hot filtrate to deposit crystals of N-tricarbocyclyl-B-triaminoborazole.

In order that those skilled in the art may better understand how the present invention can be carried into effect, the following examples are given by way of illustration and not by way of limitation. All parts and percentages are by weight unless otherwise stated.

Example 1

This example illustrates the preparation of N-triphenyl-B-triaminoborazole from N-triphenyl-B-trichloroborazole.

A 3-necked, 250 ml. flask equipped with a stirrer, Dry-Ice condenser and a drying tube containing NaOH pellets is charged with 4.0 g. N-triphenyl-B-trichloroborazole. Liquid ammonia is then introduced through the Dry-Ice condenser until a volume of approximately 150 ml. has been added. Stirring is continued for 45 minutes longer and the excess ammonia is allowed to evaporate over a period of about 16 hours. The solid, white residue is refluxed in anhydrous benzene for 20 minutes, and the insoluble ammonium chloride (obtained as a by-product of the reaction) is separated by filtering the hot mixture. The filtrate, on cooling, deposits 2.8 g. of nicely formed crystals of colorless N-triphenyl-B-triaminoborazole; M.P. 300° C. Recrystallization from dry benzene provides a purified material which shows the following upon analysis:

|  | Percent C | Percent H | Percent N | Percent B |
|---|---|---|---|---|
| Calculated for $C_{18}H_{21}N_6B_3$ | 61.09 | 5.58 | 23.75 | 9.17 |
| Found | 61.16 | 5.85 | 22.54 | 8.18 |

Example 2

Example 1 is repeated exactly with the exception that 5.3 g. of N-triphenyl-B-tribromoborazole is used in place of 4.0 g. of N-triphenyl-B-trichloroborazole. N-triphenyl-B-triaminoborazole is obtained in a yield corresponding to about 65% of the theoretical.

Example 3

Essentially the same procedure is followed as described under Example 1 with the exception that 4.16 g. of N-tri-p-tolyl-B-trichloroborazole is employed instead of 4.0 g. of N-triphenyl-B-trichloroborazole. N-tri-p-tolyl-B-triaminoborazole is obtained in a yield corresponding to about 68% of the theoretical.

Example 4

Same as in Example 1 with the exception that 4.06 g. of N-tri-cyclohexyl-B-trichloroborazole is used in place of 4.0 g. of N-triphenyl-B-trichloroborazole. N-tri-cyclohexyl-B-triaminoborazole is obtained in a yield corresponding to about 69% of the theoretical.

Example 5

This example illustrates the use of a compound of the kind embraced by Formula II as a chemical intermediate (more particularly as a resin intermediate) in making a new class of resinous materials.

| | Parts |
|---|---|
| N-triphenyl-B-triaminoborazole | 167.0 |
| Aqueous formaldehyde (approximately 37.1% HCHO) | 518.4 |
| Aqueous ammonia (approximately 28% $NH_3$) | 53.3 |
| Sodium hydroxide in 65 parts water | 0.5 |

All of the above ingredients are heated together under reflux at the boiling temperature of the reaction mass for 30 minutes, yielding a resinous syrup. This syrup is potentially heat-curable, as evidenced by the fact that when a small amount of a curing agent is incorporated therein, e.g., about 1.0% by weight thereof of phthalic anhydride, sulfamic acid, maleic anhydride, maleic acid, melamine pyrophosphate, etc., and the resulting syrup is heated on a 140° C. hot plate, it cures to a substantially insoluble, substantially infusible state.

To the main batch of syrupy reaction product is now added maleic acid in an amount sufficient to bring the syrup to a pH of about 3 to 4. The syrup is heated for a few minutes more in order to incorporate the maleic acid thoroughly therethrough.

The resulting syrup is mixed with 280 parts of alpha-cellulose in flock form and 2.8 parts of a mold lubricant, specifically zinc stearate, to form a molding (moldable) composition. The wet molding compound is dried at 60° C. until sufficient moisture has been removed so that the composition can be molded satisfactorily. A sample of the dried and ground molding compound is molded for 10 minutes at 180° C. under a pressure of about 5000 pounds per square inch. The molded piece is hard, well-cured, has a good surface finish, and also excellent resistance to heat, water and the action of an electric arc.

Example 6

A catalytic quantity of sodium is dissolved in 50 ml. of absolute ethanol contained in a 100 ml. round-bottomed flask equipped with a stirrer, thermometer and a condenser. Approximately 0.4 g. of paraformaldehyde (three equivalents) is added to the alcoholic solution and the mixture is stirred at room temperature until all the paraformaldehyde has dissolved. One (1) g. of N-triphenyl-B-triaminoborazole is then added to this solution and stirring is continued for 5 hours more (i.e., until all the borazole has gone into solution). The greater portion alcohol is stripped off and the resulting crystalline product is collected and dried in a vacuum desiccator. Infrared analysis indicates that the borazole ring is intact and that the methylol groups are attached to the amino nitrogens.

Example 7

A few drops of triethanolamine is added to 50 ml. of water until the pH is approximately 8. The solution is placed in a 100 ml. round-bottomed flask equipped with a stirrer, thermometer and condenser. Three equivalents (0.406 g.), or as much as six equivalents if desired, of paraformaldehyde are added to the aqueous solution, and the mixture is heated with stirring at about 60° C. until the solution is complete. The solution is cooled to room temperature (about 25° C.), and one equivalent (1.5 g.) N-triphenyl-B-triaminoborazole is added with stirring. The reaction mixture is refluxed for 20 minutes and filtered hot. The filtrate, on cooling and standing in the refrigerator for 1 day, deposits chunky crystalline product, which is established by infrared analysis as being the methylolated N-triphenyl-B-triaminoborazole.

Example 8

To an aqueous syrup of dimethylol melamine (100 g. per 100 ml. H$_2$O) is added 15 g. N-triphenyl-B-triaminoborazole with stirring. After solution is complete, the clear syrup is admixed with glass fibers (in the form of short staple glass yarn or chopped glass fabric), tray-dried at 110° C. for 4 hours, and the resulting brittle (when cool) resinous mass to broken up in a mill, and dried for an additional hour. The molding compound thereby obtained is molded at 150° C. at 2000 lbs. per sq. inch to give a well-molded piece with good surface properties and high strength characteristics.

Uses of the borazoles claimed in this application in more modern scientific applications have been mentioned hereinbefore.

Useful products comprising borazoles are obtained when an N-carbocyclyl-B-halogenoborazole is reacted at temperatures ranging from about −80° C. to about 200° C. with a primary, secondary or tertiary amine, but are of lesser interest from a practical standpoint because of the difficultly in isolating the products from the reaction mass, apparently because of their relative ease of hydrolysis during the normal isolation steps.

We claim:

1. A compound of the class represented by the general formula

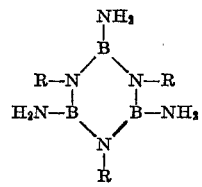

where R represents a carbocyclic radical selected from the class consisting of the phenyl, p-tolyl and cyclohexyl radicals.

2. N-triphenyl-B-triaminoborazole.

References Cited in the file of this patent

UNITED STATES PATENTS 2,754,177    Gould _____ July 10, 1956

OTHER REFERENCES

Wiberg et al.: Zeitschrift für Anorganische und Allgemeine Chemie, vol. 257, pp. 138–144 (1948).

UNITED STATES PATENT OFFICE
CERTIFICATE OF CORRECTION

Patent No. 2,951,867 — September 6, 1960

Stanley F. Stafiej et al.

It is hereby certified that error appears in the printed specification of the above numbered patent requiring correction and that the said Letters Patent should read as corrected below.

Column 2, line 61, for "expoxy" read -- epoxy --; column 5, line 14, after "portion" insert -- of --; column 6, line 3, for "mass to" read -- mass is --; line 16, for "difficultly" read -- difficulty --.

Signed and sealed this 4th day of April 1961.

(SEAL)
Attest: ERNEST W. SWIDER

Attesting Officer

ARTHUR W. CROCKER
Acting Commissioner of Patents